United States Patent Office 3,634,353
Patented Jan. 11, 1972

3,634,353
COATING COMPOSITIONS CONTAINING FLUORO-CARBON POLYMER, MONOBASIC PHOSPHATES AND PHOSPHORIC ACID
Clifford Hugh Strolle, Springfield, Pa., assignor to E. I. du Pont de Nemours and Company, Wilmington, Del.
No Drawing. Filed Nov. 3, 1969, Ser. No. 873,622
Int. Cl. C08f 45/24
U.S. Cl. 260—29.6 F          8 Claims

ABSTRACT OF THE DISCLOSURE

A composition for priming a surface to improve the adhesion of a fluorocarbon polymer topcoat. The composition contains about 50–90% fluorocarbon polymer by weight and 10–50% monobasic calcium phosphate and phosphoric acid by weight and a liquid carrier.

BACKGROUND OF THE INVENTION

This invention relates to coating compositions. It is specifically concerned with primer compositions for improving the adhesion of fluorocarbon polymer coatings to their substrates.

The fluorocarbon polymer coatings when applied to metal, glass or similar type substrates have somewhat less than desirable adhesive traits between the fluorocarbon polymer coatings and the substrate. Therefore, a need developed for a primer composition which would improve adhesion.

SUMMARY OF THE INVENTION

This invention comprises a primer composition consisting of (1) particulate fluorocarbon polymer, (2) monobasic calcium phosphate and phosphoric acid and (3) liquid carrier. This primer composition is used to prime the substrate before the fluorocarbon polymer topcoat is applied.

The fluorocarbon polymers are known polymers. They include hydrocarbon monomers completely or partially substituted with fluorine atoms or a combination of fluorine atoms and chlorine atoms. Included in this group are polytetrafluoroethylene, copolymers of tetrafluoroethylene and hexafluoropropylene in all monomer unit ratios, and fluorochlorocarbon polymers such as polymonochlorotrifluoroethylene. Polytetrafluoroethylene is preferred.

The monobasic calcium phosphate is dispersed in an aqueous solution with 50% solids by weight. The calcium ion may be replaced by manganese, strontium or any other similar divalent metal ions. However, the divalent metal ion preferred is calcium.

The phosphoric acid is dispersed in an aqueous solution which is 85% phosphoric acid by weight. Metaphosphoric or orthophosphoric acid may be used. However, the preferred phosphoric acid is orthophosphoric acid.

The liquid carrier may be water or an organic liquid miscible with water, such as, ethanol, isopropanol, acetone or a Cellosolve. Water is preferred.

The fluorocarbon polymer ordinarily present in the composition constitutes about 50% through 90% by weight of the monobasic calcium phosphate, phosphoric acid and fluorocarbon polymer solids, preferably from about 65% through 75%.

The monobasic calcium phosphate ordinarily present in the composition constitutes about 10% through 50% by weight of the monobasic calcium phosphate, phosphoric acid and fluorocarbon polymer solids, preferably from about 15% through 25%.

The phosphoric acid ordinarily present in the composition constitutes about 5% through 40% by weight of the monobasic calcium phosphate, phosphoric acid and fluorocarbon polymer solids, preferably from about 5% through 15%.

The liquid carrier is ordinarily present in the composition at a ratio of about 5% through 50% by weight of the total composition and preferably from 15% through 35%.

The composition is made by mixing in an aqueous solution proper amounts of a fluorocarbon polymer, monobasic calcium phosphate and phosphoric acid.

The resulting primer composition can be applied by spraying, brushing, dipping or roller-coating. If the surface to be coated is metal, it is preferably pretreated by grit-blasting, by the flame spraying of metals or metal oxides, or by frit-coating the substrate after application, the primer coat is air-dried and then baked at 450° F. for 20 minutes.

This primer coat is then topcoated with a conventional clear or pigmented fluorocarbon polymer enamel, and baked in the usual way, to give an adherent fluoropolymer coating.

The composition is most useful for priming metal or glass cookware for coating with polytetrafluoroethylene. This primer can also be used to prime many similar type articles for coating with polytetrafluoroethylene. Polytetrafluoroethylene sheeting that has been primed with this material can be bonded to other materials such as metals, plastics or glass.

As a specific example of the composition of this invention the following illustrative examples are given. In these examples all parts are by weight.

EXAMPLE 1

A primer composition may be prepared by thoroughly mixing

| | |
|---|---:|
| Monobasic calcium phosphate dispersion (50% solids) in water | 21.5 |
| Orthophosphoric acid (85%) | 4.2 |
| Pigment dispersion (30% solids) in water | 13.1 |
| Surfactant (available as Du Pont's Duponol) (30% solids) | 2.0 |
| Polytetrafluoroethylene aqueous dispersion (60% solids) | 59.2 |
| | 100.0 |

An aluminum sheet is cleaned. The sheet is then sprayed with the primer composition to a thickness 0.2 to 0.3 mil (dry). The sheet is then baked for 20 minutes at 450° F. after which it is topcoated with a dispersion of polytetrafluoroethylene having the following composition:

| | |
|---|---:|
| Polytetrafluoroethylene non-ionic aqueous dispersion (60% solids) | 37.0 |
| Polytetrafluoroethylene anionic aqueous dispersion (60% solids) | 13.5 |
| Polytetrafluoroethylene anionic aqueous dispersion (35% solids) | 14.4 |
| Surfactant (available as Du Pont's Duponol) (30% solids) | 6.5 |
| Pigment dispersion in water (30% solids) | 7.5 |
| Silicone dispersion in water (39.7% solids) | 10.7 |
| Toluene | 10.4 |
| | 100.0 |

The topcoat is sprayed over the primer to a total thickness of 1.2 to 1.4 mils (dry) and then baked at 750° F. for 20 minutes.

The resulting coating of polytetrafluoroethylene adheres well to the aluminum substrate.

The invention claimed is:
1. A composition consisting essentially of
   (a) from 50% through 90% by weight of particulate fluorocarbon polymer;
   (b) from 10% through 50% by weight of monobasic calcium phosphate, the percentages by weight being based on the combined weight of the solids of said fluorocarbon polymer, monobasic calcium phosphoric acid;
   (c) from 5% through 40% by weight of phosphoric acid, the percentages by weight being based on the combined weight of the solids of said fluorocarbon polymer, monobasic calcium phosphate and phosphoric acid; and
   (d) a liquid carrier selected from the group consisting of water and water miscible liquids.

2. The composition of claim 1 containing from 65% through 75% fluorocarbon, 15% through 25% of monobasic calcium phosphate, 5% through 15% phosphoric acid, and from 5% through 50% liquid carier.

3. The composition of claim 1 wherein the fluorocarbon polymer is polytetrafluoroethylene.

4. The composition of claim 2 wherein the fluorocarbon polymer is polytetrafluoroethylene.

5. The composition of claim 1 wherein the phosphoric acid is orthophosphoric acid.

6. The composition of claim 2 wherein the phosphoric acid is orthophosphoric acid.

7. The composition of claim 1 wherein the liquid carrier is water.

8. The composition of claim 2 wherein the liquid carrier is water.

References Cited
UNITED STATES PATENTS

| | | | |
|---|---|---|---|
| 2,562,118 | 7/1951 | Osdal | 260—29.6 |
| 2,917,476 | 12/1959 | Peterson et al. | 260—29.6 |
| 3,213,050 | 10/1965 | Rice | 260—29.6 |

HAROLD D. ANDERSON, Primary Examiner

U.S. Cl. X.R.

117—46 R, 72, 124 E, 132 CF, 138.8 UF; 260—29.6 MP, 32.8 R, 33.2 R, 33.4 F

PO-1050
(5/69)

UNITED STATES PATENT OFFICE
CERTIFICATE OF CORRECTION

Patent No. 3,634,353      Dated January 11, 1972

Inventor(s) Clifford Hugh Strolle

It is certified that error appears in the above-identified patent and that said Letters Patent are hereby corrected as shown below:

Column 3, line 8, after "calcium" insert -- phosphate and --.

Signed and sealed this 18th day of July 1972.

(SEAL)
Attest:

EDWARD M. FLETCHER, JR.
Attesting Officer

ROBERT GOTTSCHALK
Commissioner of Patents